(12) United States Patent
Drmota Petric et al.

(10) Patent No.: US 11,752,674 B2
(45) Date of Patent: Sep. 12, 2023

(54) ELECTRICAL OR ELECTRONIC ASSEMBLY AND METHOD FOR PRODUCING AN ELECTRICAL OR ELECTRONIC COMPONENT

(71) Applicant: KOLEKTOR GROUP D.O.O., Idrija (SI)

(72) Inventors: Ana Drmota Petric, Idrija (SI); Zmago Jereb, Idrija (SI); Ludvik Kumar, Logatec (SI)

(73) Assignee: KOLEKTOR MOBILITY D.O.O., Idrija (SI)

( * ) Notice: Subject to any disclaimer, the term of this patent is extended or adjusted under 35 U.S.C. 154(b) by 65 days.

(21) Appl. No.: 17/564,977

(22) Filed: Dec. 29, 2021

(65) Prior Publication Data

US 2022/0118662 A1   Apr. 21, 2022

Related U.S. Application Data (63) Continuation of application No. PCT/EP2020/067843, filed on Jun. 25, 2020.

(30) Foreign Application Priority Data

Jul. 2, 2019   (DE) ...................... 10 2019 117 834.7

(51) Int. Cl.
*H02K 5/02* (2006.01)
*H02K 15/14* (2006.01)
(Continued)

(52) U.S. Cl.
CPC .... *B29C 45/14221* (2013.01); *B23K 26/0823* (2013.01); *B23K 26/364* (2015.10);
(Continued)

(58) Field of Classification Search
CPC ........... H02K 5/02; H02K 15/14; H02K 7/00; H02K 7/10; H02K 11/00
(Continued)

(56) References Cited

U.S. PATENT DOCUMENTS

| 2011/0177286 A1 | 7/2011 | Maier et al. |
| 2012/0009739 A1 | 1/2012 | Abbott |

FOREIGN PATENT DOCUMENTS

| DE | 10005505 A1 * | 8/2001 | ........... H01R 13/504 |
| EP | 0714227 A2 * | 5/1996 | |

(Continued)

OTHER PUBLICATIONS

International Search Report issued by the European Patent Office for corresponding International Patent Application No. PCT/EP2020/067843, dated Aug. 24, 2020.

*Primary Examiner* — Jose A Gonzalez Quinones
(74) *Attorney, Agent, or Firm* — Myers Wolin LLC (57) ABSTRACT

A method is provided for the production of an electrical or electronic component having a conductor element with two contact points and a plastic structure injection-molded thereon. A strip-type metal substrate, having multiple conductor element blanks and a carrier structure, is provided. Grooved depressions are produced on all peripheral surfaces of the blanks on a texturing section with one or two laser light sources. With a single laser light source the grooved depressions are produced on at least two primary peripheral surfaces which adjoin one another and form a common edge such that a multiplicity of the grooved depressions extends without interruption continuously into the primary peripheral surfaces. A conductor element blank is separated from the carrier structure. The resulting conductor element is encapsulated with plastic by injection molding on all peripheral surfaces within a section to be encapsulated. The plastic (Continued)

structure thereby formed extends into the grooved depressions.

9 Claims, 5 Drawing Sheets

(51) Int. Cl.
    *H02K 7/00*     (2006.01)
    *H02K 11/00*     (2016.01)
    *B29C 45/14*     (2006.01)
    *B23K 26/364*     (2014.01)
    *B23K 26/08*     (2014.01)
    *B23K 101/38*     (2006.01)
    *B29K 705/00*     (2006.01)
    *B29L 31/34*     (2006.01)

(52) U.S. Cl.
    CPC ............... *H02K 5/02* (2013.01); *H02K 15/14* (2013.01); *B23K 2101/38* (2018.08); *B29K 2705/00* (2013.01); *B29K 2995/0005* (2013.01); *B29L 2031/34* (2013.01)

(58) Field of Classification Search
    USPC ............... 310/68 B, 68 R, 71, 75 R, 98, 215
    See application file for complete search history.

(56) References Cited

FOREIGN PATENT DOCUMENTS

| | | |
|---|---|---|
| EP | 0714227 A2 | 5/1996 |
| EP | 2307187 B1 | 10/2012 |
| WO | 2011098256 A2 | 8/2011 |
| WO | 2014156988 A1 | 10/2014 |
| WO | WO-2014156988 A1 * 10/2014 ......... B23K 26/0093 |

* cited by examiner

ELECTRICAL OR ELECTRONIC ASSEMBLY AND METHOD FOR PRODUCING AN ELECTRICAL OR ELECTRONIC COMPONENT

CROSS REFERENCE TO RELATED APPLICATIONS

This application is a continuation under 35 U.S.C. § 120 of International Application PCT/EP2020/067843, filed Jun. 25, 2020, which claims priority to German Application No. 10 2019 117 834.7, filed Jul. 2, 2019, the contents of each of which are incorporated by reference herein.

FIELD OF THE INVENTION

The present invention relates to a method for manufacturing an electrical or electronic component part, which comprises a conductor element and a plastic structure, wherein the conductor element has two contact points and a longitudinal portion disposed between them and bounded by a multiplicity of peripheral faces, and wherein further the plastic structure is bonded securely to the conductor element in such a way that it encapsulates this within an overmolded portion overlapping its longitudinal portion along the entire periphery. Furthermore, the present invention relates to an electrical or electronic assembly having an electrical or electronic component part made in particular by application of such a method as well as an electrical or electronic functional unit contacted with the conductor element and encapsulated at least partly by the plastic structure.

BACKGROUND

A particular challenge in manufacturing component parts and assemblies mentioned in the foregoing lies in configuring the bond between the conductor element and the plastic structure encapsulating this partly in such a way that it satisfies high requirements of robustness, reliability and durable impermeability to gaseous and liquid media. Component parts and assemblies are quite particularly problematic to install in motor vehicles, inasmuch as they must on the one hand be capable of being manufactured particularly easily, compactly and inexpensively, but on the other hand they are subjected to quite particularly intensive stresses and strains due to oscillations, vibrations and other shaking or shuddering phenomena.

Various approaches toward lessening or solving the foregoing problem have been discussed in the prior art:

For example, EP 2,307,187 B1 proposes a component part composite in which the surface of a first component part consisting of an aluminum alloy is treated before injection molding of a second component part consisting of a thermoplastic plastic using electromagnetic radiation in such a way that a surface structure results that has not only a microstructure but also a nanostructure. Such a surface structuring of the first component part is intended to ensure improved adhesion between the two component parts of the component part composite, in order to achieve increased strength and impermeability.

According to US 2012/0009739 A1, which relates to the manufacture of semiconductor chips, good adhesion of the overmolding consisting of a polymer material to metallic conductors in the initially smooth surface of the latter is supposed to be achieved by means of laser treatment to create a pattern of dot-like structures having respectively an indented center relative to the original surface and a ring surrounding this and raised relative to the original surface.

In view of a desired improvement of the friction properties of an electromagnetic component element or of the reflection properties of an electrooptical component element, WO 2011/098256 A2 proposes still further options for fine structuring of the surface of metal sheets or component parts by using the machining methods of grinding, abrasive blasting and rolling.

EP 0 714 227 A2 discloses a housing part injection-molded from plastic having rigid, metallic, injection-molded leads, which traverse a wall of the housing part and are used for mounting of measuring sensors. Starting from the wall, the leads also have a sheath of plastic over part of their length. This consists in a first portion, connected to the traversed wall of the housing part, of the thermoplastic plastic from which the housing is injection molded, and in a second portion, connected to the first portion, of an elastomeric plastic. The two portions of the sheath are bonded to one another in one piece, and the sheathed leads are bent in the second portion. To facilitate bending of the lead in question, the second portion of the sheath may have a waist, which is formed by a groove formed on one of its sides and extending over the entire width and a weakening provided parallel to it and disposed on the opposite side.

WO 2014/156988 A1 discloses a method for manufacturing composite-material molded bodies, with which the adhesive strength can be improved. In the method, in which a metal molded body and a resin molded body are adhesively bonded together, an adhesively bonded face of the metal molded body is irradiated with a laser beam having a laser spot diameter of 10-200 μm, in order to form a slot as well as either a ring having a diameter of 20-1000 μm or a region having similar area extent. The method for manufacturing composite-material molded bodies comprises: a first step, in which a first scan forms a slot, so that the starting point and the ending point of the laser irradiation join together with one another, and a plurality of repeated scans forms a region surrounded by the slot; a second step, in which the first step is repeated, in order to form a plurality of regions surrounded by slots; and a third step, in which a molded-body portion containing the adhesively bonded face having the regions surrounded by slots is positioned within a metal mold, and the resin that will become the resin molded body is subjected to a casting-in-place method.

A practical solution, i.e. one that satisfies all existing requirements, to the problem depicted hereinabove does not yet exist. Thus the object—marked by partial aspects competing with one another—underlying embodiments of the invention is to provide a way to manufacture a component part or an assembly indicated in the introduction, of the type indicated in the introduction, in which the bond between conductor element and plastic structure satisfies the highest requirements of robustness, reliability and durable impermeability to gaseous and liquid media, even under extreme loads, wherein the associated manufacturing process is additionally intended to be characterized by particularly low costs and relatively short process times.

SUMMARY

This object is achieved with respect to as method for manufacturing the electrical or electronic component part by the features of this disclosure and with respect to the electrical or electronic assembly by the features of this disclosure.

The disclosed method for manufacturing an electrical or electronic component part of the type indicated in the introduction comprises the following method steps:

(A) providing a strip-like metal substrate comprising a plurality of conductor element blanks and a carrier structure joining these with one another;

(B) making, by means of one or two laser light sources, groove-like depressions on all peripheral faces of the conductor element blanks, respectively on a texturing portion extending within the longitudinal portion of the subsequent conductor element, wherein, by means of one single laser light source, the groove-like depressions are made on at least two primary peripheral faces adjoining one another and forming a common edge, in such a way that a plurality of the groove-like depressions extends in uninterrupted continuous manner into the at least two primary peripheral faces, and one of the primary peripheral faces and one further, secondary peripheral face of the conductor element adjoin one another with formation of an edge in such a way that they include an angle smaller than 90° with one another, wherein the groove-like depressions of the primary peripheral face and the groove-like depressions of the secondary peripheral face overlap one another in cross-sectional view (i.e. in a projection in longitudinal direction of the conductor element);

(C) separating a conductor element blank machined in method step (B) by detaching it from the carrier structure, especially by stamping;

(D) overmolding the conductor element obtained from method step (C) within the overmolding portion on all peripheral faces with plastic to form the plastic structure, wherein the plastic of the plastic structure extends into the groove-like depressions, covered by it, of the conductor element.

Accordingly, the surface structuring of the conductor element blanks in the texturing portions of the subsequent conductor elements in method step (B) takes place at a point in time when the individual conductor element blanks are (still) part of the strip-like metal substrate, i.e. when the conductor element blanks are still joined with one another by the carrier structure and thus before they are detached from the carrier structure. Because respectively one conductor element is obtained from respectively one conductor element blank of the strip-like metal substrate in method step (C), a conductor element blank already exhibits the special features, characterized here (defined in connection with the conductor element), of the subsequent conductor element, namely peripheral faces as well as a longitudinal, texturing and overmolding portion. This metal substrate may be based in particular on copper, a copper alloy or stainless steel and be treated by electroplating. Due to the optical surface structuring of the conductor element blanks while they are still being incorporated in the composite of the metal substrate, it is possible to guide the conductor element blanks to be machined very simply past the one or two laser light sources and to position them without having to grip and position any conductor element blank individually. Thereby complex and expensive mechanical gripping and positioning devices can be made superfluous and short process times are achieved, which is advantageously manifested in low production costs.

By favorable positioning—with due consideration for the cross section of the conductor element blank (in the texturing portion of the subsequent conductor element)—of the laser light source(s) relative to the position of the respective conductor element blank being surface-machined by it (them), it is ensured that all peripheral faces of the conductor element blank in question (in the texturing portion of the subsequent conductor element) can be machined with only one or two laser light sources, without having to rotate the conductor element blank during the surface treatment.

Due to the surface structuring, without exception, of all peripheral faces of the texturing portion with the groove-like depressions, of which at least one part extends over several peripheral faces abutting at an edge, the basis is created for the formation, between conductor element and plastic structure, of a bond that is extremely robust, reliable and durably impermeable to gases and liquids. What is decisive in this respect is the design of the groove-like depressions: they are respectively passed in uninterrupted continuous manner over an edge, at which two adjacent peripheral faces of the (subsequent) conductor element adjoin one another, and they extend into the two peripheral faces in question. Because only one or two laser light sources is or are needed to machine all peripheral faces of the texturing portion, the tool investments necessary for the purpose can be reduced to a minimum, thus advantageously influencing the manufacturing costs. It is only due to the synergistic interplay of the individual features of method steps (A) to (D) that thereby the object underlying embodiments of the invention and appearing to be contradictory in its partial aspects is achieved.

The individual peripheral faces, which may be planar but also may be created in curved form, are then bounded by edges, which are formed where two peripheral faces adjoin one another with tangential planes that differ in the edge region. In order to do justice to the characteristic features of embodiments of the inventive method, a distinction is made between primary and secondary peripheral faces, depending on the circumstances under which the groove-like depressions are made on the respective peripheral face: For primary peripheral faces, the groove-like depressions are made either by the first of two laser light sources or—if only one single laser light source is used for surface machining in the entire method—they are made by the single laser light source, while the conductor element blank is passing the laser light source for the first time. For secondary peripheral faces, the groove-like depressions are made in a manner analogous to the foregoing by the second of two laser light sources or—if only one single laser light source is used for surface machining in the entire method—they are made by the single laser light source, while the conductor element blank is passing the laser light source for the second time. The surface machining carried out on the entire periphery of the conductor element blank with only one single laser light source will be discussed in still more detail in the following.

The fact that one of the primary peripheral faces and one further, secondary peripheral face of the conductor element adjoin one another with formation of an edge in such a way that they include an angle smaller than 90° with one another, wherein the groove-like depressions of the primary peripheral face and the groove-like depressions of the secondary peripheral face overlap one another in cross-sectional view (i.e. in a projection in longitudinal direction of the conductor element) means, in other words, that the groove-like depressions of the first and of the second peripheral face are sufficiently deep to overlap one another at the edges along which a primary and a secondary peripheral face adjoin one another with formation of an acute angle. Thereby it is ensured that the bond between conductor element and plastic structure also satisfies the highest requirements of robustness, reliability and durable impermeability to gaseous and liquid media and does so precisely in the region of the edge in question despite the exposed position (and the resulting notch effect). The overlapping of the groove-like depressions of primary and secondary peripheral faces adjoining one another can be made possible in particular by sufficiently small dimensioning of the corner radii of the corresponding edge or by an increase of the depth of penetration of the laser beam (e.g. by a steeper angle of penetration/incidence or a longer time of action).

As a precaution in order to avoid false impressions, it is to be pointed out that the number (e.g. one conductor element, two contact points) respectively mentioned in the scope of the definition and explanation in connection with the conductor element and the contact points is to be understood as a minimum number. Component parts and assemblies that have a larger number of these components are likewise covered by this disclosure.

A preferred further development of the method for manufacturing an electrical or electronic component part is characterized in that the groove-like depressions has a depth of 5 µm to 50 µm and a width of 5 µm to 40 µm. Particularly preferably, the depth of the groove-like depressions is 20 µm to 30 µm and their width is 15 µm to 25 µm. These cited depths and widths permit a very advantageous bond between conductor element and plastic structure, which is characterized by a particularly advantageous compromise between process time (the process time increases with increasing depth and increasing width of the groove-like depressions), requirements on the laser light source power (the requirements on and the costs for the laser light source increase with the depth and the width of the groove-like recesses), impermeability and stability of the bond between conductor element and plastic structure as well as mechanical integrity of the conductor element.

According to another preferred further embodiment of the invention, the method for manufacturing an electrical or electronic component part is characterized in that the conductor element has, in the texturing portion, a cross section having parts with the shape of a polygon, of a circular arc or of both a polygon and a circular arc. As already explained hereinabove, the interplay between cross section of the conductor element blank (or of the conductor element) and the position of the one or two laser light sources relative to the respective surface-machined conductor element blank is of influence for the formation of a bond between conductor element and plastic structure that satisfies the high requirements. Against this background, the said polygonal, circular-arc-shaped or polygonal and circular-arc-shaped cross section of the conductor element in the texturing portion proves to be particularly advantageous.

Another preferred further development of the method for manufacturing an electrical or electronic component part is characterized in that the groove-like depressions are part of a net-like or grid-like groove structure that has longitudinal and transverse grooves. This net-like or grid-like groove structure permits the formation of a quite particularly robust, reliable and durably impermeable bond between conductor element and plastic structure, since a substance-to-substance bond is formed due to the different orientation of the longitudinal and transverse grooves, which bond—especially by comparison with a groove structure having depressions running exclusively parallel to one another—depends less strongly in terms of its bond properties on the stress and strain direction and therefore is more highly isotropic, which may be an advantage, depending on the specific requirements situation.

Another advantageous further development of the method for manufacturing an electrical or electronic component part is characterized in that the groove-like depressions are made one after the other in method step (B) on all peripheral faces of the texturing portion of the conductor element blank by means of only one single laser light source, wherein the strip-like metal substrate is guided in the manner of a twisted ribbon so that the respective conductor element blank is guided one time with its primary peripheral faces and one time with its other, secondary peripheral faces past the laser light source and turned toward it. Thus the conductor element blank is guided respectively two times past one and the same laser light source and in the process is subjected—in two steps—to the surface machining of all peripheral faces in the texturing portion. In this way it is possible to ensure that all peripheral faces are surface-machinable with only one single laser light source instead of two, which results advantageously in a reduction of the investment and maintenance costs of the production system and thus ultimately in lower costs for the component part to be manufactured.

In yet another preferred further development, the method for manufacturing an electrical or electronic component part is characterized in that the conductor element obtained from method step (C) is contacted at one of its contact points at least with an electrical or electronic functional unit and in that the electrical or electronic functional unit is overmolded at least partly with plastic during method step (D). In this way it is possible to manufacture a complex assembly, in which the electrical functional unit—and especially its contacting with the conductor element—is embedded at least partly in the plastic structure, which advantageously favors the integrity, the robustness and the long-term stability of the assembly.

As explained hereinabove, embodiments of the invention extends not only to the already described method for manufacturing an electrical or electronic component part but also to the electrical or electronic assembly itself. Embodiments of the inventive electrical or electronic assembly comprise an electrical or electronic functional unit, especially a stator unit, a conductor element and a plastic structure. They are characterized by the following features:

the conductor element has two contact points and a longitudinal portion, which is disposed between them and bounded by a multiplicity of peripheral faces;

the electrical or electronic functional unit is contacted (at one of the contact points) with the conductor element;

the conductor element has, on all peripheral faces of a texturing portion extending within the longitudinal portion, groove-like depressions, wherein a plurality of the groove-like depressions extends in uninterrupted continuous manner into at least two primary peripheral faces adjoining one another and forming a common edge, and one of the primary peripheral faces and one further, secondary peripheral face of the conductor element adjoin one another with formation of an edge in such a way that they include an angle smaller than 90° with one another, wherein the groove-like depressions of the primary peripheral face and the groove-like depressions of the secondary peripheral face overlap one another in cross-sectional view (i.e. in a projection in longitudinal direction of the conductor element);

the plastic structure at least partly encapsulates the electrical or electronic functional unit and is securely bonded to the conductor element, in that it encapsulates this within an overmolding portion overlapping its longitudinal portion along the entire periphery, wherein the plastic structure extends into the groove-like depressions, covered by it, of the conductor element.

These uninterrupted groove-like depressions extending continuously into at least two peripheral faces adjoining one another and forming a common edge contribute to the fact that a quite particularly robust, reliable and durably impermeable bond is also formed between conductor element and plastic structure and in fact precisely in the edge region, since engagement of the plastic structure in the depressions of the conductor elements in tongue-and-groove manner favoring a substance-to-substance bond is also made possible in the edge region.

According to a preferred further embodiment of the invention, the electrical or electronic assembly is characterized in that the functional unit is designed as a stator unit and the assembly as the motor housing of a motor-pump unit, wherein the motor-pump unit comprises a rotor unit and is suitable for conveying a fluid, wherein furthermore the stator unit is encapsulated only partly by the plastic structure and is bare in a region turned toward the rotor unit, wherein this bare region of the stator unit as well as the rotor unit is exposed to the conveyed fluid. In this further development, the characteristic features and advantageous effects in the synergistic interplay are quite particularly effective: Due to the integration of the stator unit and the conductor element into the one common plastic structure with formation of a motor housing, an extremely compact, low-tolerance and mechanically stable component is made possible. The circumstance that the stator unit is uncovered in a region exposed to fluid and turned toward the rotor unit is due to the effort to realize the smallest possible gap between these two component parts with the objective of increasing the motor efficiency. However, this is permitted only by the robust, reliable and durably impermeable bond between conductor element and plastic structure, since it durably able to prevent fluid conveyed by the pump from creeping along at the boundary layer between plastic structure and conductor element and reaching and damaging sensitive electronic and electrical devices with which the conductor element is contacted at its second contact point.

These notions underlying embodiments of the invention can likewise be applied together with the cited advantages to an electrical or electronic component part. This component part comprises a conductor element having two contact points, wherein the conductor element has a longitudinal portion bounded by a multiplicity of peripheral faces between the contact points, as well as a plastic structure securely bonded to the conductor element, and encapsulates this conductor element within an overmolded portion overlapping its longitudinal portion along the entire periphery. This conductor element has, on all peripheral faces of a texturing portion extending within the longitudinal portion, groove-like depressions, wherein a plurality of the groove-like depressions extends in uninterrupted continuous manner into at least two peripheral faces adjoining one another and forming a common edge, and wherein the plastic structure extends into the groove-like depressions, covered by it, of the conductor element.

Here also, i.e. in relation to inventive products, it is the case that the number (e.g. one conductor element, two contact points, one functional unit) respectively mentioned in connection with the conductor element, the contact points and the functional unit is to be understood as a minimum number. Component parts and assemblies that have a larger number of these components are likewise covered by this disclosure.

BRIEF DESCRIPTION OF THE DRAWING

Several forms of materialization and exemplary embodiments of the invention will be explained in more detail hereinafter on the basis of the drawing, wherein.

DETAILED DESCRIPTION OF THE PREFERRED EMBODIMENTS

Figure 1A:
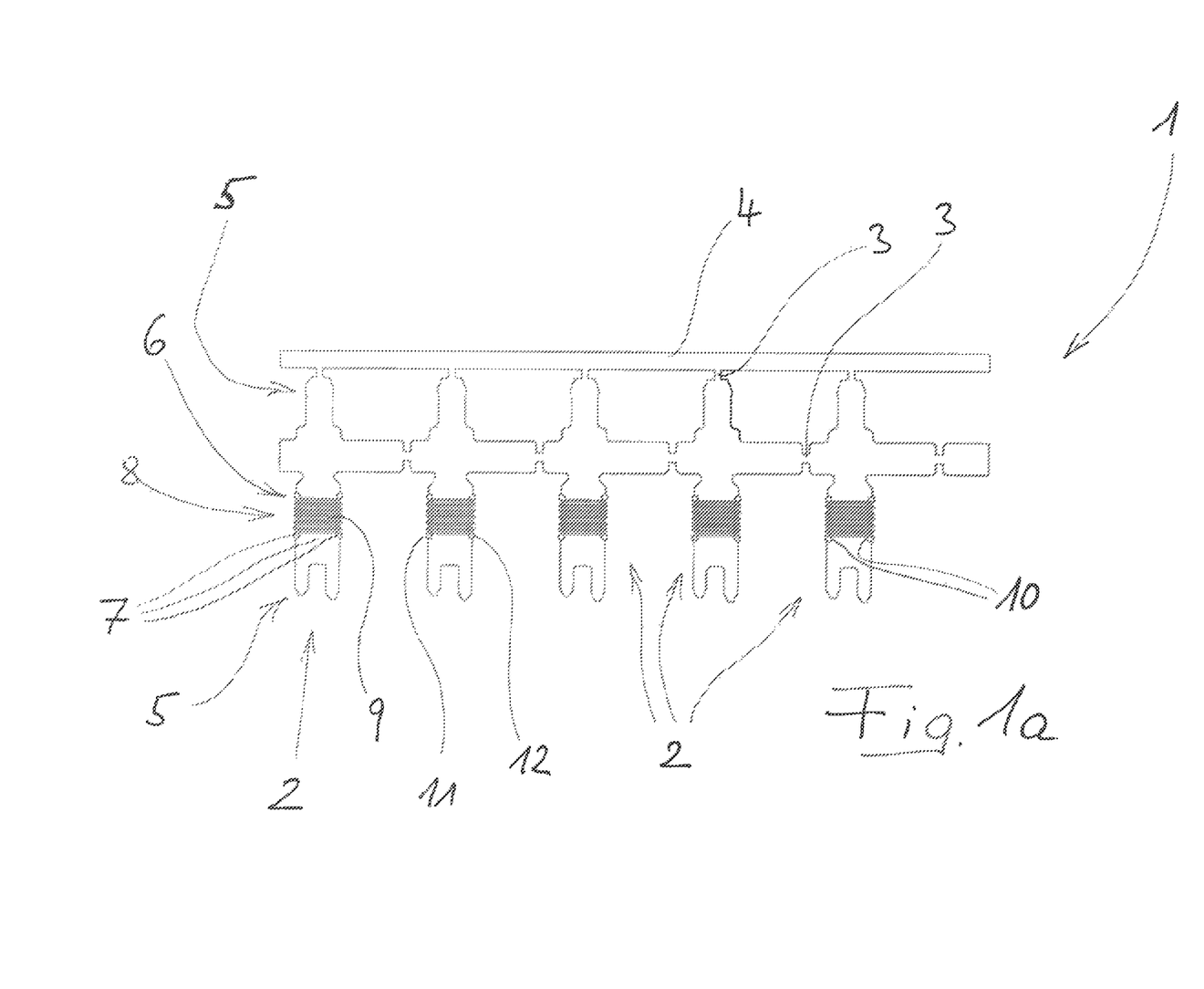
FIG. 1a shows in plan view and FIG. 1b shows in oblique view a strip-like metal substrate having several conductor element blanks surface treated according to method step (B) of the discussion herein, FIG. 2 schematically shows a cross section through a conductor element blank according to FIGS. 1a and 1b in the texturing portion as well as the two positions from which the surface machining by the one or the two laser light source(s) takes place, FIG. 3 schematically shows the cross sections of various conductor elements designed alternatively to FIG. 2 in the respective texturing portion as well as the respective two positions from which the surface machining by the one or the two laser light sources takes place.
Figure 1B:
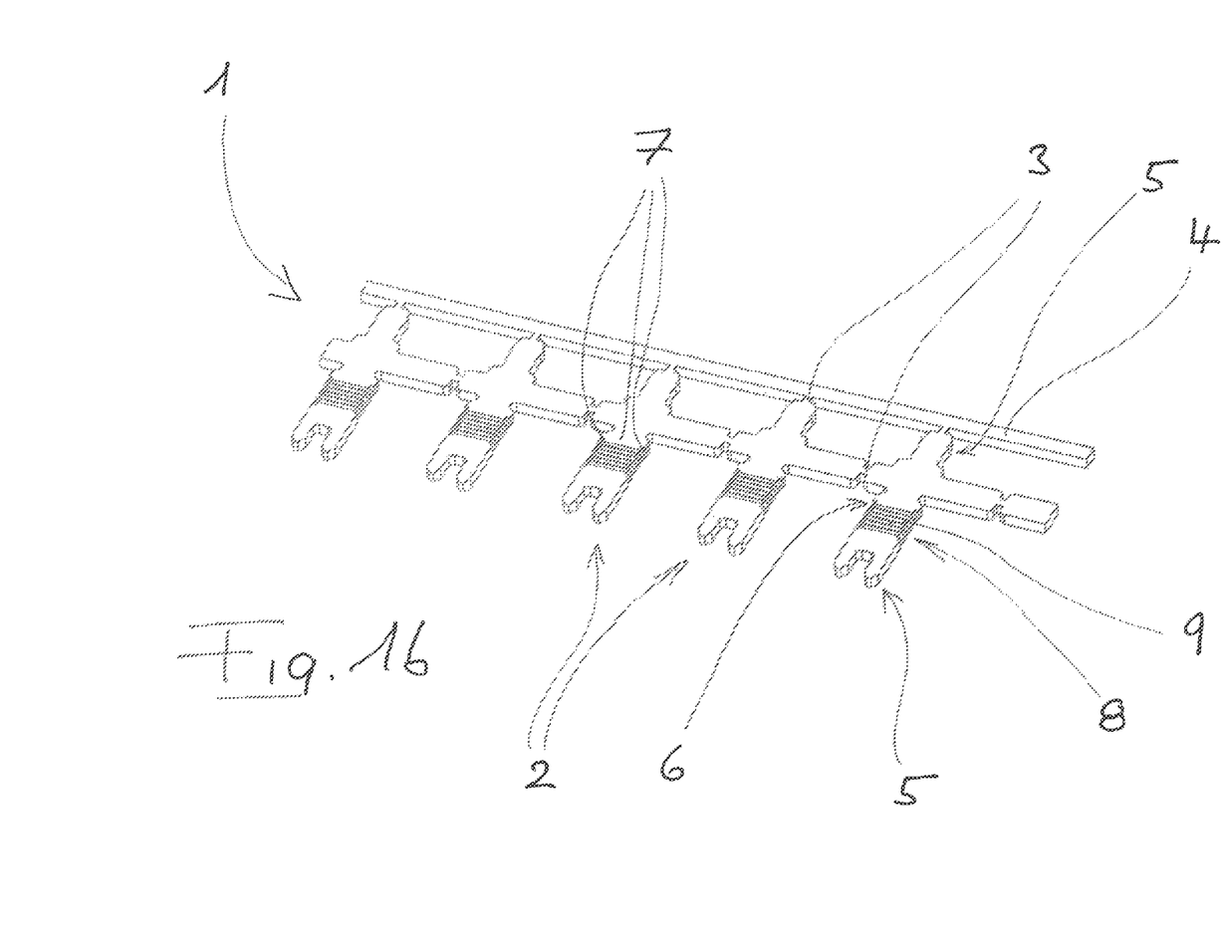

FIGS. 1a and 1b illustrate a strip-like metal substrate 1 having a sequence of several identical conductor element blanks 2. These are joined via bridging webs 3 both to one another and also with a continuous stick-like carrier structure 4. Conductor element blanks 2, just as conductor elements 2' obtained from them by separation (by means of stamping or shearing), have two contact points 5, substantially at their ends, designed and suitable for contacting of adjoining electrical parts.

Figure 2:
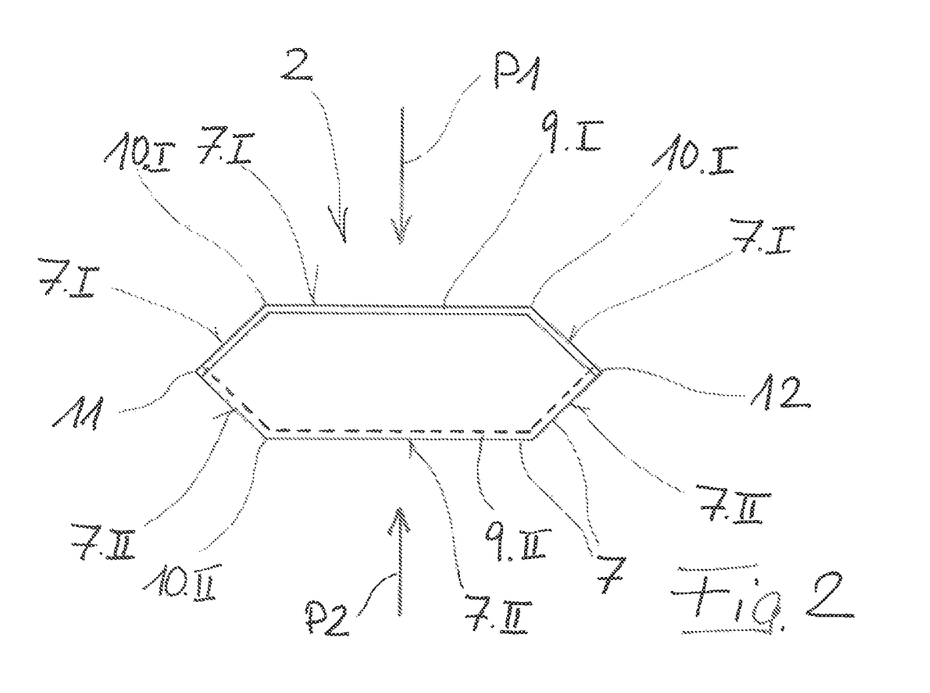

Each conductor element blank 2 has a longitudinal portion 6, which is disposed between its two contact points 5 and has a polygonal cross section, namely a flat elongated hexagonal cross section (see FIG. 2). In other words, in this longitudinal portion 6, the conductor element blank 2 is bounded by in total six—in this case planar—peripheral faces 7.

In a texturing portion 8 disposed within longitudinal portion 6, conductor element blank 2 has groove-like depressions 9 on all of its six peripheral faces 7. Depending on the individual configuration of the method, these are made using one single laser light source (see FIG. 4) or else two laser light sources. The two arrows P1 and P2 of FIG. 2 mark the position(s) of the one or else two surface-machining laser light source(s) relative to conductor element blank 2 during texturing of the six peripheral faces 7. Regardless of the number of laser light sources used in total, it is the case that groove-like depressions 9.I on the three primary peripheral faces 7.I adjoining one another and forming two common edges 10.I in total were made by means of only one single laser light source positioned according to P1. A plurality of groove-like depressions 9.I extends in uninterrupted continuous manner into the three primary peripheral faces 7.I adjoining one another and forming two common edges 10.I in total.

The three secondary peripheral faces 7.II opposite the three primary peripheral faces 7.I likewise have a plurality of groove-like depressions 9.II, which extend in uninterrupted continuous manner into the three secondary peripheral faces 7.II adjoining one another and forming two common edges 10.II in total. Respectively one primary peripheral face 7.I and one secondary peripheral face 7.II adjoin one another at the two edges 11, 12 and enclose approximately a right angle with one another (in cross sectional view, the corresponding planes intersect at an angle of approximately 90°. In cross sectional view, the groove-like depressions 9.I and 9.II of the respective primary peripheral faces 7.I and secondary peripheral faces 7.II then overlap in the region of edges 11 and 12. In other words: Because of their depth, the groove-like depressions 9.I open into the two outer secondary peripheral faces 7.II and the groove-like depressions 9.II open into the two outer primary peripheral faces 7.I. As illustrated in FIG. 2, the groove-like depressions 9.I and 9.II do not have to be flush with one another, i.e. merge into one another at edges 11 and 12; to the contrary, they may—but do not have to—be offset from one another.

Figure 3:
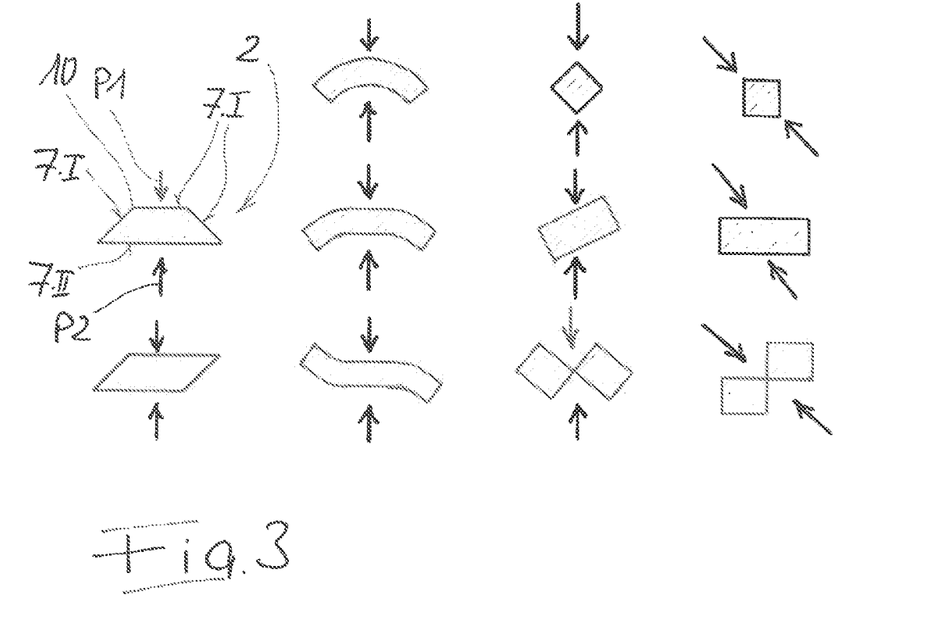

FIG. 3 illustrates—in each case before the groove-like depressions are made—the cross sections of a plurality of other conductor element blanks 2 in their respective texturing portion 8, which may prove to be particularly advantageous depending on the specific requirements situation. In particular, cross sections are shown in the form of a trapezoid, a parallelogram, a circular arc, a multiple-angled plate, a square, a rectangle and a double rectangle. Here also the two arrows P1 and P2 symbolize the respective positions of the one or else two surface-machining laser light source(s) relative to the respective conductor element blank 2. For reasons of clarity, the reference symbols have been shown only for one of the cross sections illustrated in FIG. 3; nevertheless, obviously the reference symbols are also valid by analogy for the other cross sections of FIG. 3.

Figure 4:
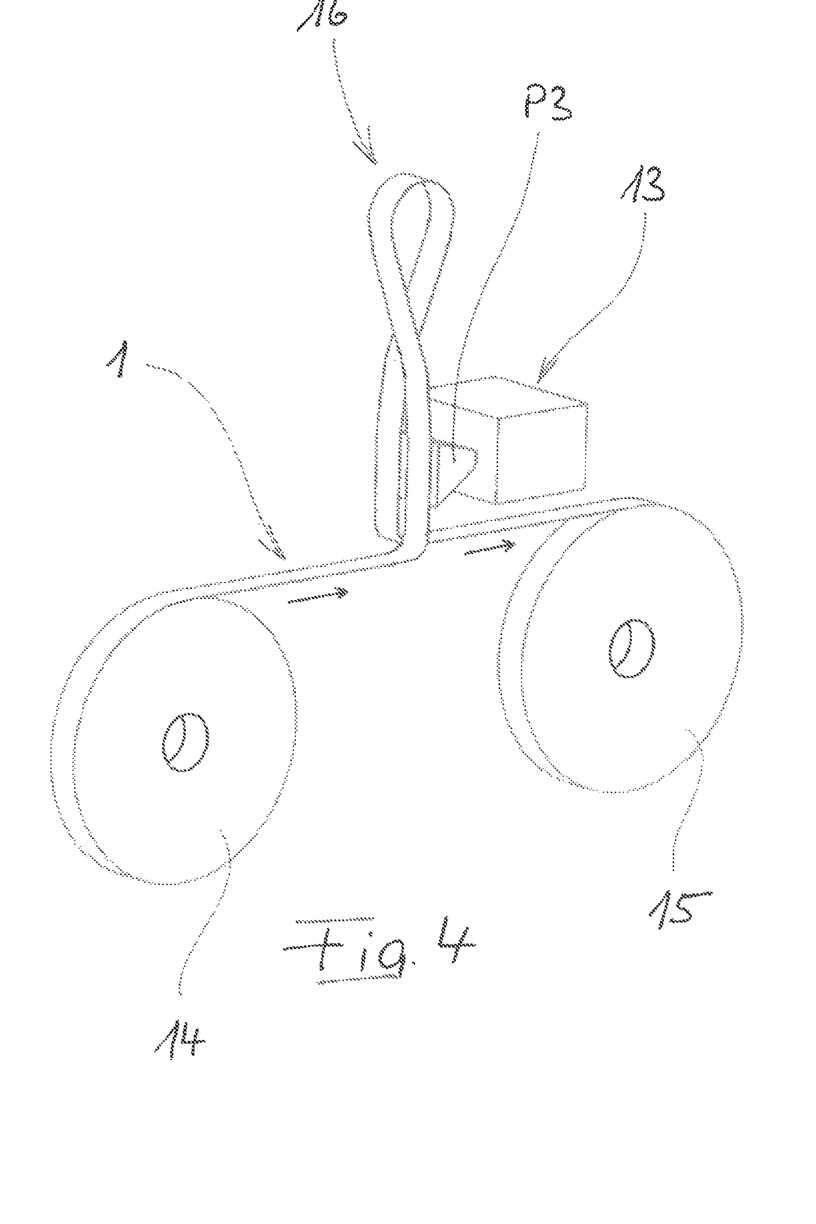
FIG. 4 shows a strip-like metal substrate being guided in the manner of a twisted ribbon together with a single laser light source in oblique view.

FIG. 4 illustrates, in an oblique view, how a strip-like metal substrate 1 (shown only schematically) according to FIG. 1a and FIG. 1b is guided in the manner of a twisted ribbon past one single light source 13. The polyhedron P3 here marks that region in which surface machining in approved manner is possible by the laser light source 13 during regular operation. The machining of the conductor element blanks 2 embedded in the metal substrate 1 (see FIGS. 1a and 1b) takes place after the metal substrate 1 has ben unwound from a first roll 14 and before it is wound onto a second roll 15. In the process, the strip-like metal substrate 1 is guided in the manner of a twisted ribbon in a loop 16, so that each conductor element blank 2 is guided one time with its primary peripheral faces 7.I and one time with its secondary peripheral faces 7.II past the one laser light source 13 and turned toward it (wherein, for reasons of clarity, the guide device guiding the metal substrate 1 is not illustrated). In this way it is ensured that one and the same laser light source 13 is able to surface-machine both the primary peripheral faces 7.I and the secondary peripheral faces 7.II, thus obviating the need for a second laser light source.

Figure 5:
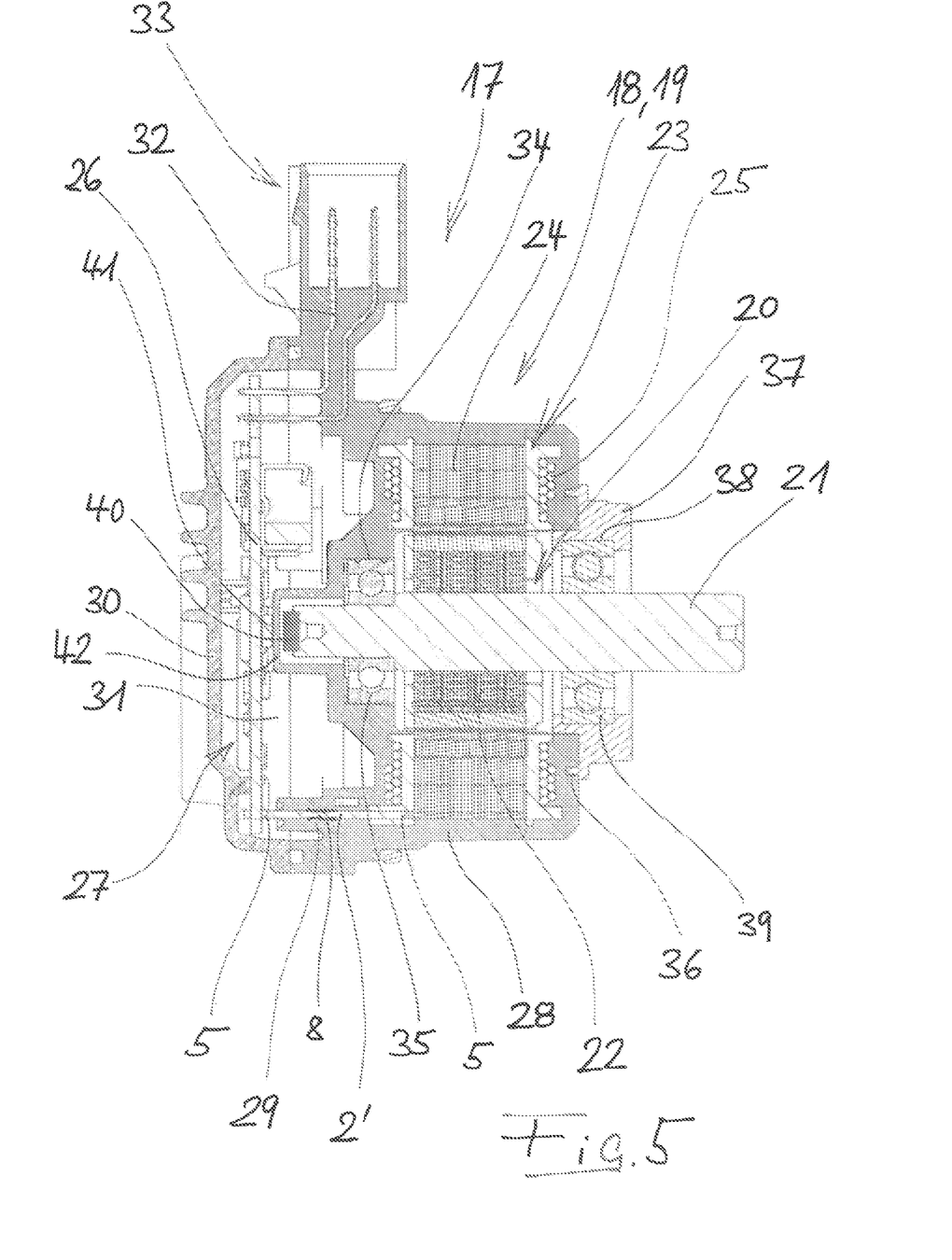
FIG. 5 shows the side view of an inventive assembly, which is part of a motor-pump unit.

FIG. 5 represents a side view of the motor part 17 of a motor-pump unit suitable for conveying a fluid. The shown motor part comprises a stator structure 18, which is designed as an inventive assembly 19, as well as a rotor unit 20 received rotatably therein. Rotor unit 20 comprises in standard manner a shaft 21—which drives the pump part of the motor-pump unit—and an armature 22 rigidly joined to it. And the stator structure 18 comprises a stator unit 23, which in a manner standard as such has several stator windings 25 respectively arranged on a stator core 24. Stator windings 25 are contacted via conductor elements 2' (designed according to FIGS. 1 and 2)—only one of these conductor elements 2' is suitable—with the printed circuit board 26 of an electronic control system 27.

Stator structure 18 further comprises a housing-like plastic structure 28, which—in an injection molding machine—is injection molded onto the preassembled unit of stator unit 23 and conductor elements 2' joined contactingly with its stator windings 25. Conductor elements 2' are embedded only for part of their length (the "overmolding portion" 29) in plastic structure 28, i.e. are encapsulated along their entire periphery; they extend—for the purpose of their subsequent contacting with printed circuit board 26 at the contact point 5 in question—somewhat out of the plastic structure 28 and thus project into a receiving space 31—which is closed by a cover 30—for printed circuit board 26. Apart from that, motor terminals 32 are also embedded in plastic structure 28, and they extend, respectively bare at the end, from a terminal socket 33 into receiving space 31 for printed circuit board 26.

A seat 34 for a first rotor bearing 35 is also formed on plastic structure 28. At the front end, plastic structure 28 has a centering device 36 for a bearing ring 37, in the seat 38 of which a second rotor bearing 39 is inserted. In a region turned toward rotor unit 20, stator unit 23 is uncovered, i.e. is not overcoated with plastic structure 28, and so this bare region of stator unit 23 is exposed to the conveyed fluid, just as is the case for rotor unit 20. Thus fluid is able to creep under plastic structure 28 along stator unit 23 as far as conductor elements 2'.

During injection molding of plastic structure 28, however, melt penetrates into the groove-like depressions 9, 9' of conductor element 2' and, in the region of the respective overmolding portion 29, namely at the respective texturing structure 8 of the conductor element 2' in question, brings about reliable durable sealing of receiving space 31 for printed circuit board 26 relative to the receiving space for rotor unit 20.

It is also evident in FIG. 5 that the rotary encoder 40 also disposed at the front end on rotor shaft 21 is situated opposite sensor 41 disposed on printed circuit board 26. The rotary measurement takes place contactlessly. Here also, partition wall 42 constructed on plastic structure 28 achieves hermetically impermeable decoupling of receiving space 31 for printed circuit board 26 from the receiving space for rotor unit 20.

What is claimed is:

1. A method for manufacturing an electrical or electronic component part, which comprises a conductor element (2') and a plastic structure (28), wherein the conductor element (2') has two contact points (5) and a longitudinal portion (6) disposed between them and bounded by a multiplicity of peripheral faces (7) and wherein further the plastic structure (28) is bonded securely to the conductor element (2') in such a way that it encapsulates this within an overmolded portion (29) overlapping its longitudinal portion (6) along the entire periphery, with the following method steps:
  (a) providing a strip-like metal substrate (1) comprising a plurality of conductor element blanks (2) and a carrier structure (4) joining these with one another;
  (b) making, by means of one or two laser light sources (13), groove-like depressions (9) on all peripheral faces (7) of the conductor element blanks (2), respectively on a texturing portion (8) extending within the longitudinal portion (6) of the subsequent conductor element (2'),
    wherein, by means of one single laser light source (13), the groove-like depressions (9.I) are made on at least two primary peripheral faces (7.I) adjoining one another and forming a common edge (10.I), in such a way that a plurality of the groove-like depressions (9.I) extends in uninterrupted continuous manner into the at least two primary peripheral faces (7.I), and one of the primary peripheral faces (7.I) and one further, secondary peripheral face (7.II) of the conductor element (2') adjoin one another with formation of an edge (11, 12) and intersect at an angle smaller than or equal to 90° in cross-sectional view, wherein the groove-like depressions (9.I, 9.II) of the primary and of the secondary peripheral faces (7.I, 7.II) overlap in cross-sectional view;

(c) separating a conductor element blank (2) machined in method step (b) by detaching it from the carrier structure (4), especially by stamping;

(d) overmolding the conductor element (2') obtained from method step (c) within the overmolding portion (29) on all peripheral faces (7) with plastic to form the plastic structure (28), wherein the plastic of the plastic structure (28) extends into the groove-like depressions (9), covered by it, of the conductor element (2').

2. The method for manufacturing an electrical or electronic component part of claim 1, wherein the groove-like depressions (9) have a depth of 5 μm to 50 μm and a width of 5 μm to 40 μm.

3. The method for manufacturing an electrical or electronic component part of claim 2, wherein the groove-like depressions (9) have a depth of 20 μm to 30 μm and a width of 15 μm to 25 μm.

4. The method for manufacturing an electrical or electronic component part of claim 1, wherein the conductor element (2') has, in the texturing portion (8), a cross section having parts with the shape of a polygon, of a circular arc or of both a polygon and a circular arc.

5. The method for manufacturing an electrical or electronic component part of claim 1, wherein the groove-like depressions (9) are part of a net-like or grid-like groove structure that has longitudinal and transverse grooves.

6. The method for manufacturing an electrical or electronic component part of claim 1, wherein the groove-like depressions (9) are made one after the other in method step (b) on all peripheral faces (7) of the texturing portion (8) of the conductor element blank (2) by means of only one laser light source (13), wherein the strip-like metal substrate (1) is guided in the manner of a twisted ribbon so that the respective conductor element blank (2) is guided one time with its primary peripheral faces (7.I) and one time with its other, secondary peripheral faces (7.II) past the laser light source (13) and turned toward it.

7. The method for manufacturing an electrical or electronic component part of claim 1, wherein the conductor element (2') obtained from method step (c) is contacted at one of its contact points (5) at least with an electrical or electronic functional unit, which is overmolded at least partly with plastic during method step (d).

8. An electrical or electronic assembly (19), comprising an electrical or electronic functional unit, especially a stator unit (23), a conductor element (2') and a plastic structure (28), having the following features:

the conductor element (2') has two contact points (5) and a longitudinal portion (6), which is disposed between them and bounded by a multiplicity of peripheral faces (7);

the electrical or electronic functional unit is contacted with the conductor element (2');

the conductor element (2') has, on all peripheral faces (7) of a texturing portion (8) extending within the longitudinal portion (6), groove-like depressions (9), wherein a plurality of the groove-like depressions (9.I) extends in uninterrupted continuous manner into at least two primary peripheral faces (7.I) adjoining one another and forming a common edge (10.I) and one of the primary peripheral faces (7.I) and one further, secondary peripheral face (7.II) of the conductor element (2') adjoin one another with formation of an edge (11, 12) and intersect at an angle smaller than or equal to 90° in cross-sectional view, wherein the groove-like depressions (9.I, 9.II) of the primary and of the secondary peripheral faces (7.I, 7.II) overlap in cross-sectional view;

the plastic structure (28) at least partly encapsulates the electrical or electronic functional unit and is bonded securely to the conductor element (2'), in that it encapsulates this within an overmolding portion (29) overlapping its longitudinal portion (6) along the entire periphery, wherein the plastic structure (28) extends into the groove-like depressions (9), covered by it, of the conductor element (2').

9. The electrical or electronic assembly (16) of claim 8, wherein the functional unit is designed as a stator unit (23) and the assembly as the stator structure (18) of a motor-pump unit, wherein the motor-pump unit comprises a rotor unit (20) and is suitable for conveying a fluid, wherein the stator unit (23) is encapsulated only partly by the plastic structure (28) and is uncovered in a region turned toward the rotor unit (20), wherein this bare region of the stator unit (23) as well as the rotor unit (20) is exposed to the conveyed fluid.

* * * * *